(12) United States Patent
Blair et al.

(10) Patent No.: US 8,331,270 B2
(45) Date of Patent: Dec. 11, 2012

(54) IN-BAND COMMUNICATION OF NETWORK STATISTICS OVER A FICON NETWORK

(75) Inventors: Michael D. Blair, Cary, NC (US);
Praveen Jain, Cupertino, CA (US);
Cheyne Monroe Womble, Hillsborough, NC (US); Glenn C. Ferris, Raleigh, NC (US); Mangesh Shingane, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 12/904,295

(22) Filed: Oct. 14, 2010
(Under 37 CFR 1.47)

(65) Prior Publication Data
US 2012/0093149 A1 Apr. 19, 2012

(51) Int. Cl.
*H04L 12/56* (2006.01)
*H04J 1/16* (2006.01)
(52) U.S. Cl. .................. 370/282; 370/252; 370/386
(58) Field of Classification Search .................. 370/252, 370/282, 386
See application file for complete search history.

(56) References Cited

U.S. PATENT DOCUMENTS
6,321,264 B1 * 11/2001 Fletcher et al. ............... 709/224

OTHER PUBLICATIONS

Meurer, "Revolutionize your Information Infrastructure with IBM Data Center Networking", IBM Storage Networking, Information Infrastructure Forum, Jun. 16, 2009.

* cited by examiner

*Primary Examiner* — John Pezzlo
(74) *Attorney, Agent, or Firm* — Edell, Shapiro & Finnan, LLC

(57) ABSTRACT

In one embodiment a method is provided for requesting and receiving network statistics in-band of a data replication exchange. The method includes receiving, at a switch, a request packet, initiated from a data replication system, for in-band delivery of network statistics, modifying the request packet to include a command that can be processed by a data storage device that is periodically accessed in connection with the data replication system, sending the request packet including the command to the data storage device, receiving from the peripheral device, in response to the request packet including the command, a response packet that includes data responsive to the command, deleting from a data field of the response packet the data responsive to the command and adding to the data field network statistics data available to the switch, and sending the response packet including the network statistics data to one of another switch or a host device from which the request packet was sent.

20 Claims, 7 Drawing Sheets

IN-BAND COMMUNICATION OF NETWORK STATISTICS OVER A FICON NETWORK

TECHNICAL FIELD

The present disclosure relates to data backup systems, particularly data backup systems that operate across large distances using electronic networks.

BACKGROUND

The demand for business continuity, disaster recovery, and remote operating capabilities continue to increase in the marketplace. Compounding the difficulty in meeting this demand is the fact that some enterprises have global operations that require backup or replication services and data access capabilities that can extend over thousands of miles to and from geographically dispersed datacenters. Recent developments in networking technologies, including, e.g., wide area networks (WANs), have enabled longer distance connectivity.

For example, FC-SB4 also commonly referred to as FICON (Fiber Connectivity) is a Fibre Channel (FC) layer 4 protocol used to communicate with mainframe peripheral devices such as disk drives and the like. FICON is used extensively in replicating and mirroring data stored on disk drives that are associated with mainframes. One issue with FICON is its inability to operate over long distances. In fact, native FICON may operate only at distances on the order of up to 100 kilometers at full data rates. As a result, FICON, on its own, is not suitable for long haul backup systems. On the other hand, FICON is, in many cases, the de facto standard for communication within a mainframe computing environment. That is, backup, replication and data access approaches that leverage FICON are "tried and true" and many administrators and information technology (IT) professionals have relied on FICON-based functionality for many years. In light of the foregoing, improvements in long distance data operations, especially in connection with mainframe computing operations, are desired.

DESCRIPTION OF EXAMPLE EMBODIMENTS

Overview

Figure 1:
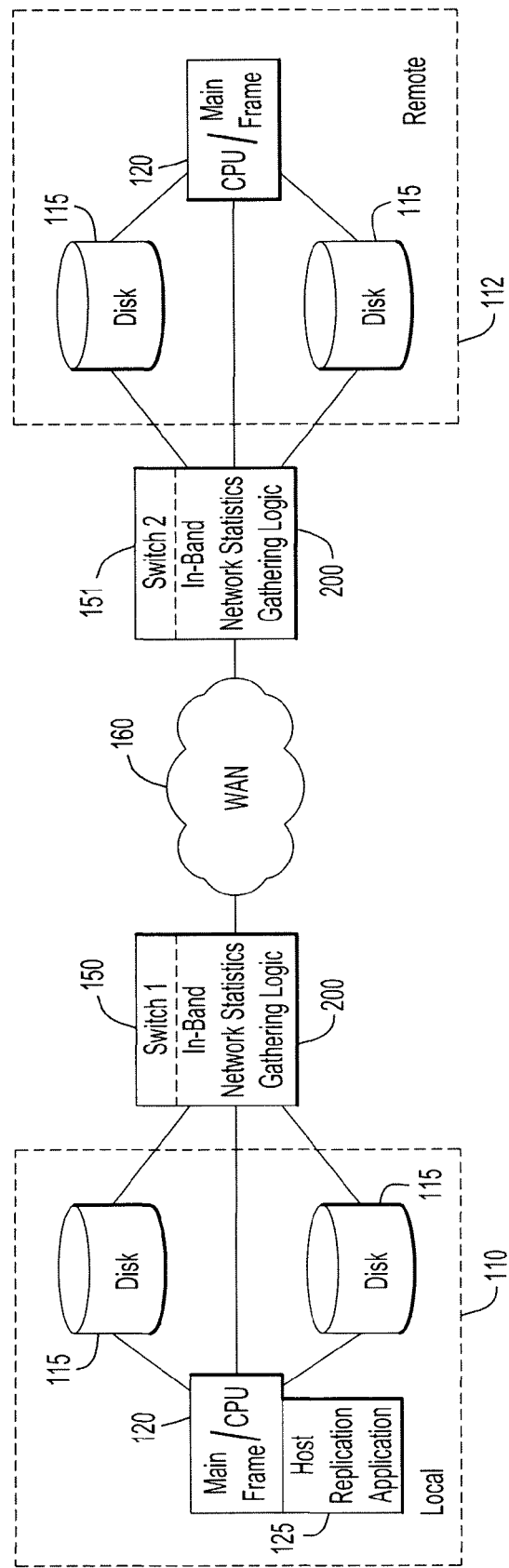
FIG. 1 shows two datacenters interconnected via two switches each having in-band network statistics forwarding logic.

In one embodiment a method is provided for requesting and receiving network statistics in-band of a data replication exchange. The method includes receiving, at a switch, a request packet, initiated from a data replication system, for in-band delivery of network statistics, modifying the request packet to include a command that can be processed by a data storage device, such as a disk drive, that is periodically accessed in connection with the data replication system, sending the request packet including the command to the data storage device, receiving from the storage device, in response to the request packet including the command, a response packet that includes data responsive to the command, deleting from a data field of the response packet the data responsive to the command and adding to the data field network statistics data available to the switch, and sending the response packet including the network statistics data to one of another switch or a host device from which the request packet was sent.

Example Embodiments

Many mainframe users implement disk data replication between two sites asynchronously as part of disaster recovery plans. One approach for asynchronous replication is, in an IBM mainframe environment, known as Extended Remote Copy ("XRC") for z/OS, where z/OS is IBM's mainframe operating system. XRC allows a mainframe at a local datacenter (e.g., a replication datacenter) to use special channel commands to pull data from remote disk(s) (or disk arrays) (not located within the local datacenter) over FICON channels and then to write received data or records to a disk at the local site.

When the distance between the datacenters is over, e.g., 200 km, the FICON L4 flow control protocol can cause these replication data flows to slow down. Indeed, after a certain point, the throughput that a host is able to drive the link decreases in direct proportion to the distance. That is, the longer the distance, the slower the FICON link becomes, and thus the slower the backup operation becomes.

To address the reduction in speed across a given FICON channel, some backup or data replication implementations have employed intermediary networks that operate according to standards or protocols that may be less susceptible to speed issues over long distances. One standard that has become popular is the ubiquitous Transmission Control Protocol (TCP) and Internet Protocol (IP), which, together, can easily pass data over thousands of kilometers.

Like many replication approaches, XRC can identify certain types of errors in data being returned. Such errors are often catalogued in a log file that can be analyzed manually or automatically. However, XRC and like replication approaches have no insight into the operation or performance of any intermediary network, such as one operating in accordance with TCP/IP. In fact, replication applications are typically oblivious to the fact that replication is being performed over an intermediary network with devices separated by, perhaps, thousands of kilometers. As a result, it may be difficult or even impossible to correlate detected and logged data errors from a given disk being replicated with network errors, where the network errors might in fact be a root cause of the detected errors.

Referring now to FIG. 1, there is shown a local datacenter 110 and a remote datacenter 112. These datacenters 110, 112 comprise, among other devices, a plurality of electronic data storage units such as disk drives 115 (or other types of memory or storage devices) that may be connected to a computer 120, such as a mainframe computer having multiple central processing units (CPUs) (hereinafter "mainframe 120"). Further, the mainframe 120 may be connected to respective switches, namely Switch 1 150 and Switch 2 151. In this case, mainframe 120 in local datacenter 110 is connected to Switch 1 150 and mainframe 120 in remote datacenter 112 is connected Switch 2 151. Disk drives 115 may themselves be connected directly to the Switches 150, 151 as shown. Switches 150, 151 may be connected to each other via a wide area network (WAN) 160 or any other suitable electronic network that enables the Switches 150, 151 to communicate with one another.

Also shown in FIG. 1 and associated with each Switch 150, 151 is in-band network statistics gathering logic 200, the function of which is described in detail below. In the context of the instant description, the term "network statistics" is meant to include information regarding network performance and errors as well as information regarding channel extender (described later) performance and errors.

In general, however, and in one embodiment, in-band network statistics gathering logic 200 operates at both Switches 150, 151. In-band network statistics gathering logic 200 at the local datacenter 110 end detects a request for network statistics within a FICON request from e.g., host replication application 125 running on mainframe 120. Switch 1 150 passes the request to Switch 2 151 via WAN 160. In this particular embodiment, in-band network statistics gathering logic 200 associated with Switch 2 151 converts the request to a generic FICON disk related command that is then passed to one or more disks 115 (or arrays) within the remote datacenter 112.

Switch 2 151 and associated in-band network statistics gathering logic 200, receives a FICON reply to the request and strips out the data portion of the reply packet supplied by the disk(s) (or arrays), and replaces that data with network statistics available to Switch 2 151. That FICON packet, now including network statistics available to Switch 2 151, is then passed to Switch 1 150. At Switch 1 150, in-band network statistics gathering logic 200 adds to the FICON reply packet network statistics available to Switch 1 150. Then, the FICON reply packet with networks statistics from both Switch 2 151 and Switch 1 150 is returned to the original requestor, namely host replication application 125 running on mainframe 120, where network statistics information can be correlated with data replication errors, e.g., log files, as desired.

Figure 2:
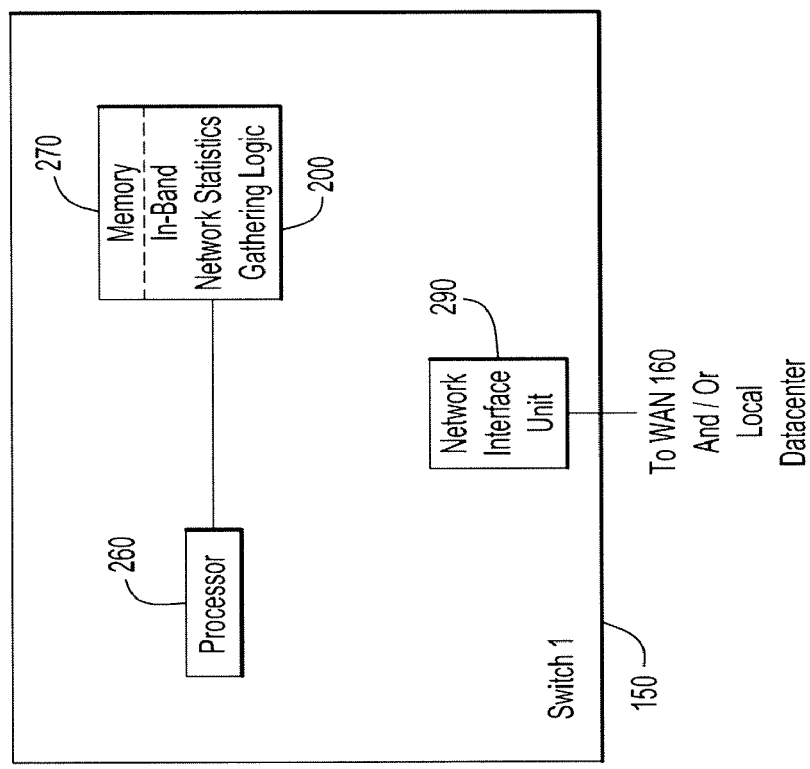
FIG. 2 shows one possible arrangement for implementing a switch having in-band network statistics forwarding logic.

FIG. 2 shows one possible implementation for Switch 1 150 along with in-band network statistics forwarding logic 200. The functionality of Switch 1 150 and in-band network statistics gathering logic 200 may be implemented as one or more hardware components, one or more software components (written in, e.g., C++, Java, microcode, among many other possible languages/implementations), or combinations thereof. More specifically, Switch 1 150 and in-band network statistics gathering logic 200 may be comprised of or be in communication with a programmable processor (microprocessor or microcontroller) or a fixed-logic processor 260. In the case of a programmable processor, any associated memory 270 may be of any type of tangible processor readable memory (e.g., random access, read-only, etc.) that is encoded with or stores instructions, such as in-band network statistics gathering logic 200, that may be employed to effect the packet data replacement functionality briefly described above and in more detail below. Alternatively, Switch 1 150 and in-band network statistics gathering logic 200 may be comprised of a fixed-logic processing device, such as an application specific integrated circuit (ASIC) or digital signal processor that is configured with firmware comprised of instructions or logic (e.g., in-band network statistics gathering logic 200) that cause the processor 260 to perform the functions described herein. Thus, Switch 1 150 and in-band network statistics gathering logic 200 may take any of a variety of forms, so as to be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor readable medium that is encoded with instructions for execution by a processor that, when executed by the processor, are operable to cause the processor to perform the functions described herein. To enable connectivity with network infrastructure (e.g., WAN 160 and/or elements within remote datacenter 110), a network interface unit 290 may also be provided. Switch 2 151 and its associated in-band network statistics gathering logic 200 would have a similar, if not identical, implementation or arrangement.

As mentioned, replication applications performed in connection with, e.g., a mainframe system, may not have visibility into cross-site links, i.e., intermediary network connections, and thus are not cognizant of, e.g., the state of WAN connectivity and performance. This can make it difficult for administrators and IT personnel to correlate error logs from mainframe replication tools and applications with errors that may have occurred over an intermediary network.

In accordance with an embodiment, the in-band network statistics gathering logic 200 in combination with Switches 150, 151 enables the capability to pass performance and error statistics data to a host mainframe for use in correlation with errors that may be reported from a replication application.

Figure 3:
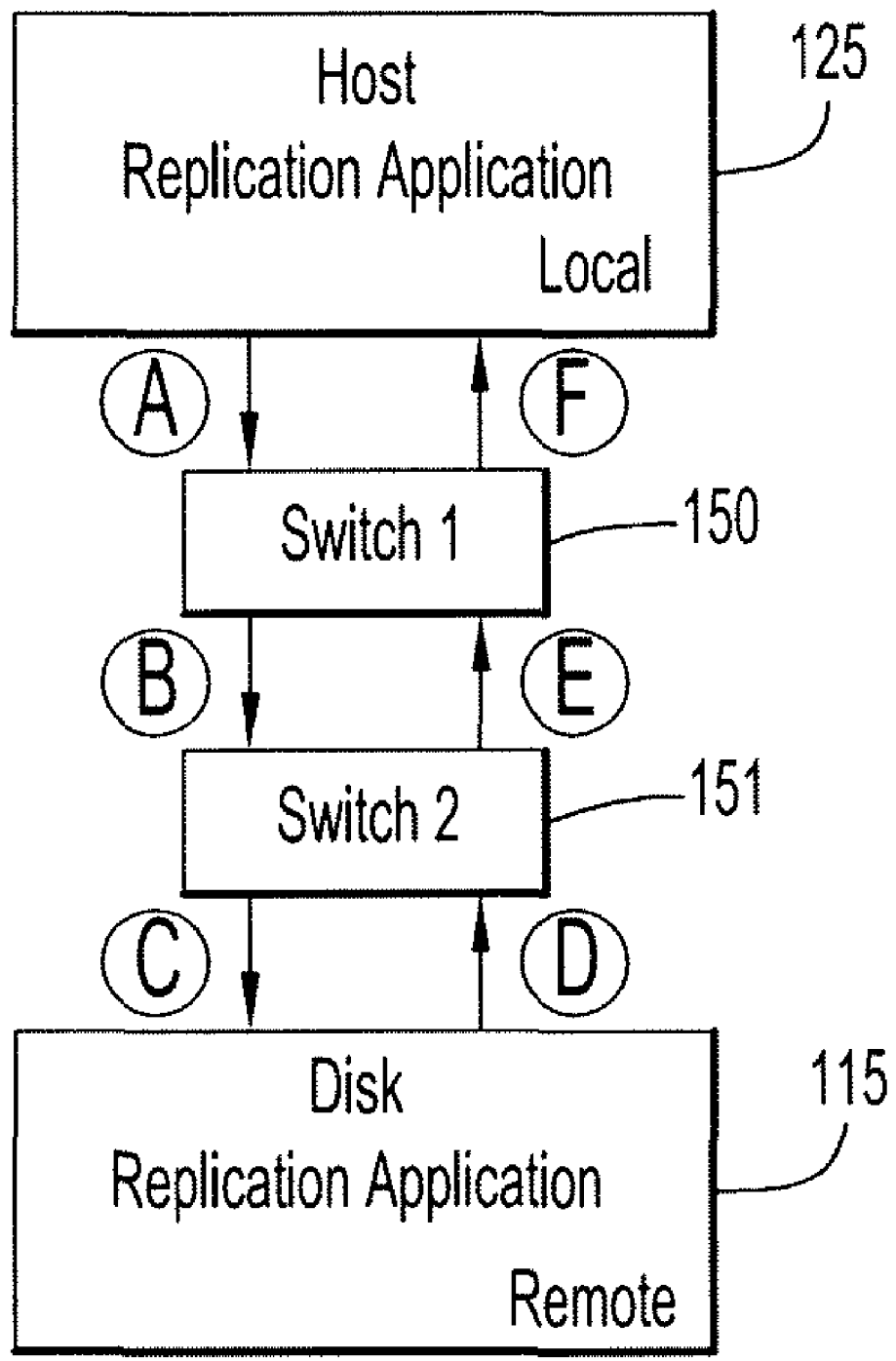
FIG. 3 shows an example exchange of FICON frames in accordance with one possible implementation for obtaining network statistics over a FICON network using in-band statistics forwarding logic.

Reference is now made to FIG. 3, which shows an example exchange of a request and a reply in accordance with one possible implementation for obtaining network statistics over, in this particular implementation, a FICON network. Those skilled in the art will appreciate, however, that other protocols may be employed and that the following explanation in connection with FICON is to be considered only as an example.

Figure 4A:
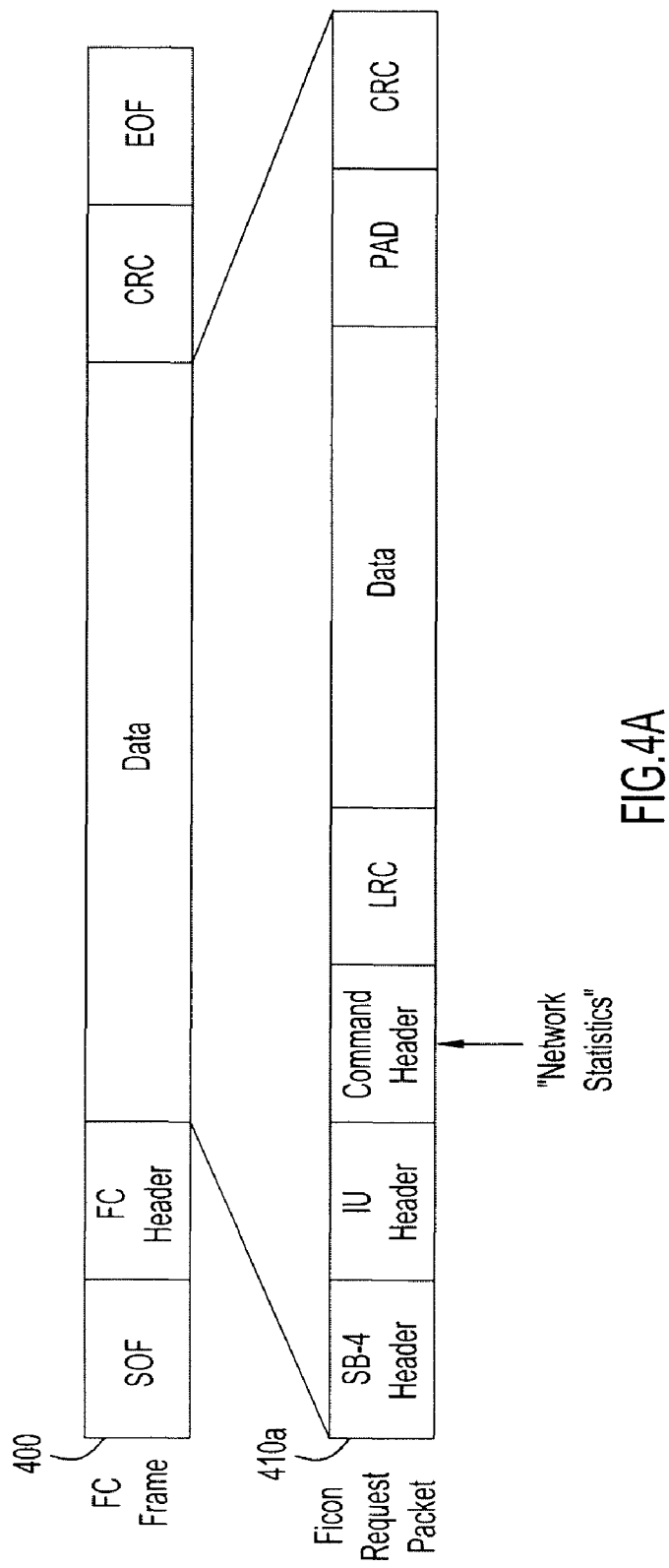
FIGS. 4A-4E are schematic representations of FICON frames that are employed to request and to deliver network statistics.

At Step A in FIG. 3, Switch 1 150 receives a request, e.g., a FICON packet encapsulated in a fibre channel (FC) frame, indicating a request for network statistics. This request may be initiated by, e.g., host data replication application 125 running on the local mainframe 120. FIG. 4A shows a simplified schematic diagram of a FC frame 400 that encapsulates a FICON packet 410a. Each FC frame 400 includes two exchange id values (an originator and a responder in the FC header), i.e., exchange identifiers that uniquely identifies a communication exchange with, ultimately, another network element, e.g., a disk drive 115 in remote datacenter 112. The FICON packet 410a includes a command header, which in this case indicates, among other possible data, a flag or command for "network statistics," i.e., a request for network and channel extender related information that is available to Switches 150, 151.

At Step B in FIG. 3, the FICON request packet of FIG. 4A is forwarded from Switch 1 150 (which may also be referred to as a "local channel extender") across the site-to-site WAN 160 to Switch 2 151 (which may also be referred as a "remote channel extender"). In this particular implementation, the flow may be sent via fiber channel over IP, or fcip. At the remote channel extender Switch 2 151, this FICON request packet is modified into a generic command type (namely, one that does not request statistics so that a downstream device can properly interpret the command) and sent, at Step C, to a disk drive 115 (or array) that is running the data replication application.

Figure 4B:
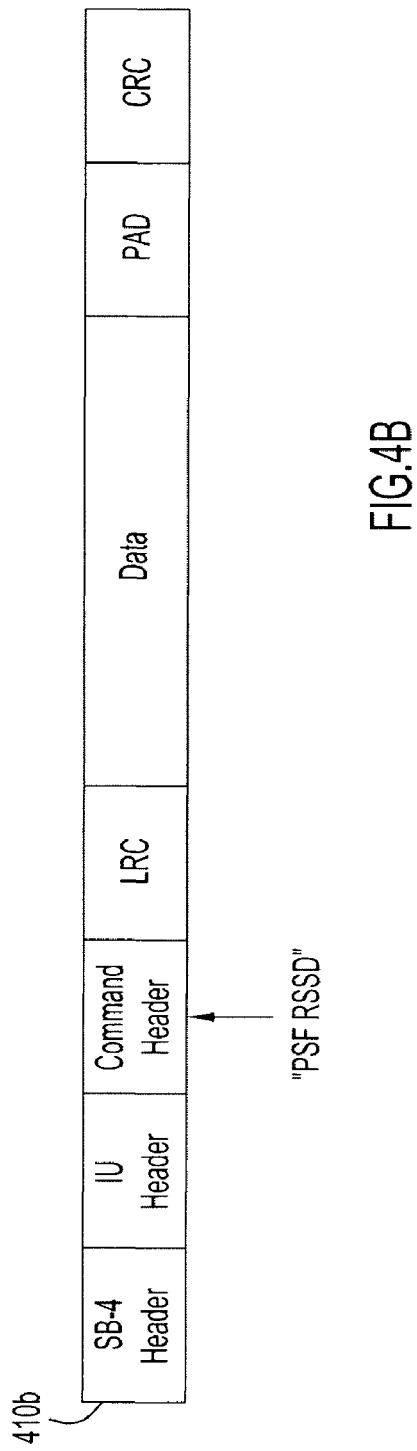

FIG. 4B shows a FICON packet 410b with its command header modified. In one possible implementation, the generic command used may be, e.g., a Perform Subsystem Command Read SubSystem Data (PSF RSSD) command, a disk command. A generic command such as this one is used since the disk drive 115 would not be responsive to a "network statistics" command. In any event, while it would be possible for Switch 2 151 to respond directly to the network statistics request, it would have to do so in the context of an FC frame and would therefore have to generate an oxid. In order to avoid overlapping oxid values that may be generated by other remote devices such as disk drives, the generic command is sent to the disk drive 115 so that it, the disk drive 115, generates a unique oxid that will then be used for the reply flow back to the mainframe 120 in local datacenter 110.

Figure 4C:
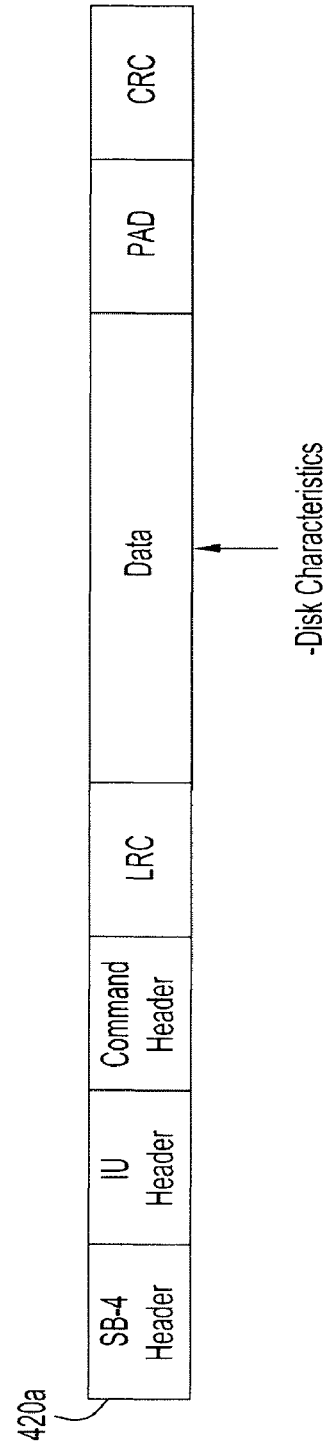

More specifically, at Step D Switch 2 151 receives a reply flow from disk drive 115 with an oxid generated at disk drive 115 in remote datacenter 112. That reply flow includes data (e.g., disk characteristics) responsive to the PSF RSSD command in its data field, as shown in FIG. 4C.

Figure 4D:
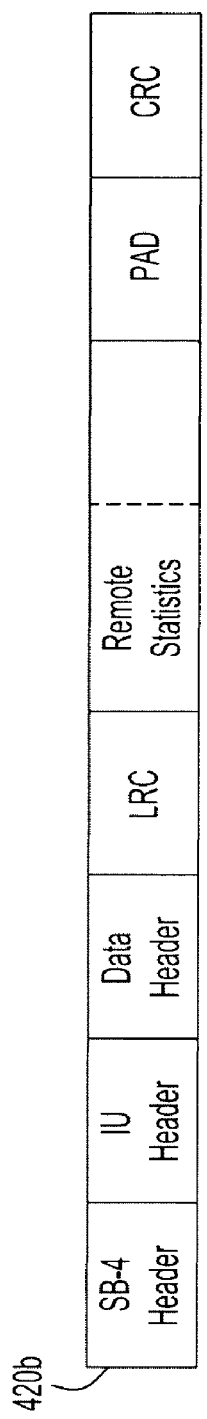

The remote channel extender, namely Switch 2 151 in operation with in-band network statistics gathering logic 200, takes the received frame from the disk array and removes the disk information from the data portion of the FICON reply packet and replaces it with a data block that contains room for two sets of network statistics (one local and the other remote). The remote channel extender (Switch 151 with in-band network statistics gathering logic 200) then fills in pertinent network statistics for the remote channel extender and sends the FICON packet back across the site-to-site IP link, e.g. WAN 160, as indicated by step E in FIG. 3. FIG. 4D depicts FICON reply packet 420*b* that includes remote switch network statistics that partially fills the data field of the packet.

Figure 4E:
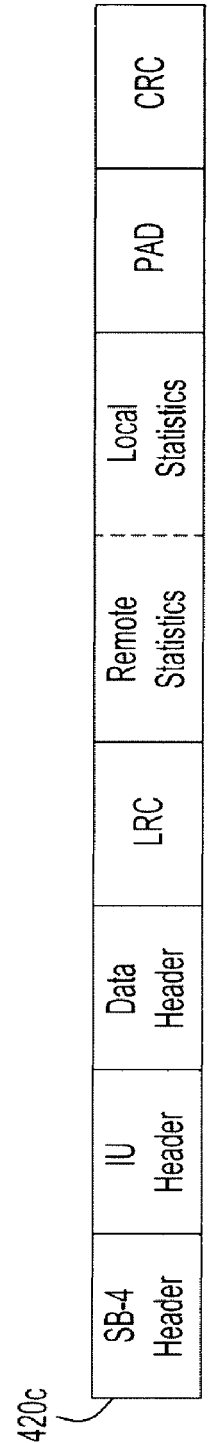

Upon receipt of the reply packet 420*b*, the local channel extender, namely Switch 1 150 in operation with in-band network statistics gathering logic 200, intercepts the packet and adds the statistics for its side (local), and, e.g., recomputes the appropriate CRCs. FIG. 4E depicts reply packet 420*c* that includes network statistics from both Switches 150, 151.

At step F, as shown in FIG. 3, the reply packet 420*c* that includes the network statistics supplied by Switches 150 and 151 and the oxid provided from the disk drive (or disk array) is then passed back to host replication application 125 running or mainframe 120.

The network statistics data can be gathered periodically and archived on the host so that in the event of an issue with data replication, this data can be used with other logs and performance data being collected by the host to determine if a network issue may be responsible for the problem.

The table below identifies the types of network statistics (which, again, may include channel extender information) that may be supplied by each of the Switches 150, 151 and thus to host replication application 125.

---

Number of packets transmitted over this FCIP interface (1)
Number of bytes transmitted over this FCIP interface (2)
Number of packets received over this FCIP interface (3)
Number of bytes received over this FCIP interface (4)
Number of Read Record Set (RRS) commands accelerated (5)
Number of Read Record Set commands not accelerated (6)
Number of buffer allocation failures (7)
Number of TCP retransmit timeouts (8)
Number of packets retransmitted by TCP (9)
Number of bytes retransmitted by TCP (10)
Number of packets with TCP checksum errors (11)
Measured round trip time (RTT) in milliseconds for this interface (12)
IP fragments received (13)
Out of order TCP packets (14)
Out of order TCP bytes (15)
Receive bytes before compression (16)
Receive bytes after compression (17)
Transmit bytes before compression (18)
Transmit bytes after compression (19)

---

Those skilled in the art will appreciate that the foregoing list of statistics is only for purposes of example, and that fewer and additional statistics may be supplied by the Switches 150, 151 as desired.

Figure 5:
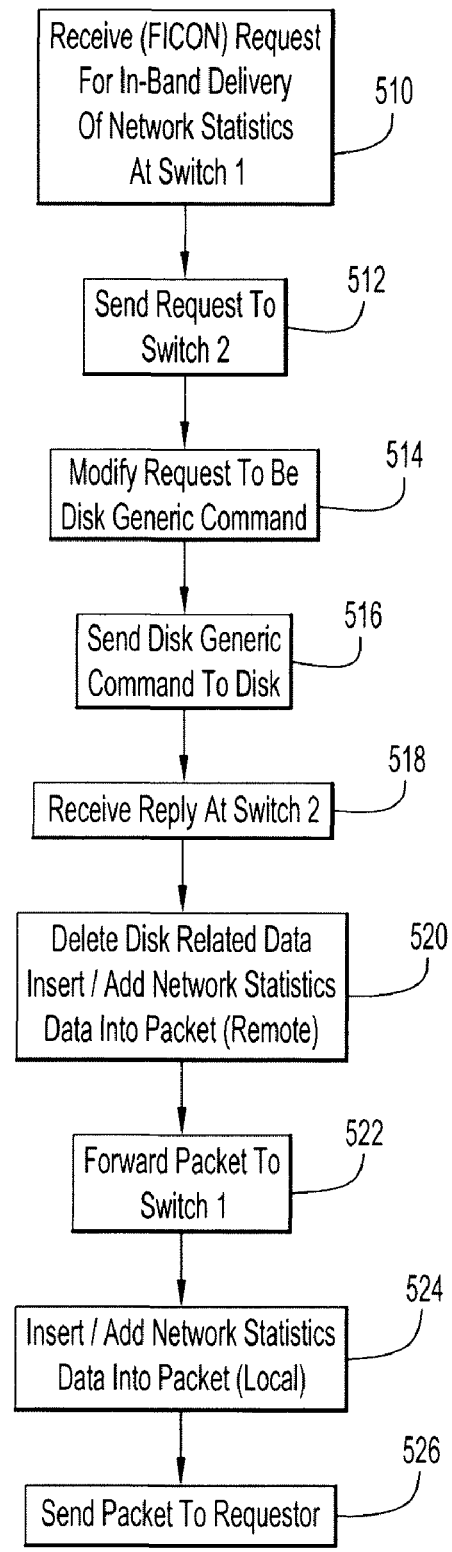
FIG. 5 depicts an example series of steps that may be performed to obtain in-band network statistics in a FICON network.

Reference is now made to FIG. 5, which depicts an example series of steps that may be performed to obtain in-band network statistics in a FICON network. Beginning at step 510, a request is received to obtain network statistics. This request is an in-band request and is received at a network device such as Switch 1 150. At step 512, that request is passed to a second switch, such as Switch 2 151, across a network, e.g., WAN 160. At step 514, the command within the packet received at Switch 2 151 is modified to be a generic disk command (or other peripheral command).

At step 516 the modified packet, now having a generic command request, is sent to a disk drive or array of disks (or other storage device). At step 518, in response to the generic command request, Switch 2 151 receives a reply. That reply, in the context of a FICON exchange also includes a unique oxid generated by the disk drive.

At step 520, the data associated with the reply packet responsive to the generic command is stripped away and in its place is added network statistics that are available to Switch 2 151. At step 522, the packet containing the network statistics supplied by Switch 2 is then passed to Switch 1 150. At step 524, Switch 1 150 adds network statistics available to Switch 1 150. Finally, at step 526, the packet, now including network statistics from both Switches 150, 151, is sent to the original requester, e.g., a data replication application running on a mainframe.

It is noted that while the embodiments described herein have had each Switch 150, 151 add its own network statistics to the reply packet, it is also possible that the switches can perform this task for each other as well. More specifically, the methodology could be configured to have one of the switches periodically send its network statistics to the other one of the switches, and the other one of the switches, and its in-band network statistics forwarding logic, could add both sets of statistics to the reply packet.

Furthermore, although only two switches have been described, embodiments could also be implemented that permit multiple switches to supply network statistics.

In sum, the embodiments and methodologies described herein gather channel extender statistics for data replication applications that have been extended over long distances via an electronic network and, in a particular implementation, via in-band communication over FICON channels that are themselves performing data replication. These statistics may be gathered by a host, such as a mainframe, for use in debugging data replication issues so that a more complete end-to-end understanding of data replication activities can be obtained.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:
1. A method, comprising:
receiving, at a switch, a request packet, initiated from a data replication system, for in-band delivery of network statistics;

modifying the request packet to include a command that can be processed by a data storage device that is periodically accessed in connection with the data replication system;

sending the request packet including the command to the data storage device;

receiving from the data storage device, in response to the request packet including the command, a response packet that includes data responsive to the command;

deleting from a data field of the response packet the data responsive to the command and adding to the data field network statistics data available to the switch; and sending the response packet including the network statistics data to one of another switch or a host device from which the request packet was sent.

2. The method of claim 1, further comprising receiving the request packet via a fibre connectivity (FICON) network.

3. The method of claim 1, further comprising sending the response packet including the network statistics data via a wide area network.

4. The method of claim 1, further comprising sending the response packet including the network statistics data via fibre channel over internet protocol.

5. The method of claim 1, further comprising adding to the data field of the response packet network statistics data available to the another switch.

6. The method of claim 5, wherein the adding to the data field of the response packet network statistics data available to the another switch is performed by the switch.

7. The method of claim 1, further comprising receiving the request packet from the another switch.

8. The method of claim 1, wherein the data storage device comprises a disk drive or an array of disk drives.

9. A processor readable medium encoded with instructions that, when executed by a processor, cause the processor to:

receive a request packet, initiated from a data replication system, for in-band delivery of network statistics;

modify the request packet to include a command that can be processed by a data storage device that is periodically accessed in connection with the data replication system;

send the request packet including the command to the data storage device;

receive from the data storage device, in response to the request packet including the command, a response packet that includes data responsive to the command;

delete from a data field of the response packet the data responsive to the command and add to the data field network statistics data available to a switch; and send the response packet including the network statistics data to one of another switch or a host device from which the request packet was sent.

10. The processor readable medium of claim 9, further comprising instructions that, when executed by the processor, cause the processor to:

receive the request packet via a fibre connectivity (FICON) network.

11. The processor readable medium of claim 9, further comprising instructions that, when executed by the processor, cause the processor to:

send the response packet including the network statistics data via a wide area network.

12. The processor readable medium of claim 9, further comprising instructions that, when executed by the processor, cause the processor to:

send the response packet including the network statistics data via fibre channel over internet protocol.

13. The processor readable medium of claim 9, further comprising instructions that, when executed by the processor, cause the processor to:

add to the data field of the response packet network statistics data available to the another switch.

14. The processor readable medium of claim 9, further comprising instructions that, when executed by the processor, cause the processor to:

receive the request packet from the another switch.

15. An apparatus, comprising:

a network interface; and a processor that is configured to:

receive, via the network interface, a request packet, initiated from a data replication system, for in-band delivery of network statistics;

modify the request packet to include a command that can be processed by a data storage device that is periodically accessed in connection with the data replication system;

send the request packet including the command to the data storage device;

receive from the data storage device, in response to the request packet including the command, a response packet that includes data responsive to the command;

delete from a data field of the response packet the data responsive to the command and add to the data field network statistics data available to a switch; and send the response packet including the network statistics data to one of another switch or a host device from which the request packet was sent.

16. The apparatus of claim 15, wherein the processor is further configured to:

receive the request packet via a fibre connectivity (FICON) network.

17. The apparatus of claim 15, wherein the processor is further configured to:

send the response packet including the network statistics data via a wide area network.

18. The apparatus of claim 15, wherein the processor is further configured to:

send the response packet including the network statistics data via fibre channel over internet protocol.

19. The apparatus of claim 15, wherein the processor is further configured to:

add to the data field of the response packet network statistics data available to the another switch.

20. The apparatus of claim 15, wherein the processor is further configured to:

receive the request packet from the another switch.

* * * * *